(12) United States Patent
Cook et al.

(10) Patent No.: US 8,866,876 B2
(45) Date of Patent: Oct. 21, 2014

(54) COLOR CORRECTION FOR MULTIPLE VIDEO OBJECTS IN TELEPRESENCE APPLICATIONS

(75) Inventors: Gregory W. Cook, San Jose, CA (US); Fengjun Lv, Sunnyvale, CA (US); Antontius Kalker, Mountain View, CA (US)

(73) Assignee: Futurewei Technologies, Inc., Plano, TX (US)

( * ) Notice: Subject to any disclaimer, the term of this patent is extended or adjusted under 35 U.S.C. 154(b) by 300 days.

(21) Appl. No.: 13/467,672

(22) Filed: May 9, 2012

(65) Prior Publication Data

US 2013/0147896 A1    Jun. 13, 2013

Related U.S. Application Data

(60) Provisional application No. 61/567,730, filed on Dec. 7, 2011.

(51) Int. Cl.
*H04N 7/15* (2006.01)
*H04N 19/20* (2014.01)

(52) U.S. Cl.
CPC ............ *H04N 7/15* (2013.01); *H04N 19/00387* (2013.01)
USPC ..................................................... 348/14.08

(58) Field of Classification Search
CPC ................. H04N 19/00387; H04N 19/0089; H04N 19/00903; H04N 7/142; H04N 7/147; H04N 5/2354; H04N 7/15
USPC ............ 348/14.08, 14.09, 14.1, 14.01, 14.07, 348/14.16
See application file for complete search history.

(56) References Cited

U.S. PATENT DOCUMENTS

| | | | | |
|---|---|---|---|---|
| 7,924,306 | B2 * | 4/2011 | Thielman et al. | 348/14.1 |
| 8,144,186 | B2 * | 3/2012 | Wagner | 348/14.09 |
| 8,149,260 | B2 * | 4/2012 | Baker | 348/14.08 |
| 2005/0078172 | A1 * | 4/2005 | Harville et al. | 348/14.09 |
| 2011/0102539 | A1 * | 5/2011 | Ferren | 348/14.08 |
| 2012/0293603 | A1 | 11/2012 | Wang | |

FOREIGN PATENT DOCUMENTS

| CN | 101262606 A | 9/2008 |
|---|---|---|
| CN | 101404765 A | 4/2009 |
| CN | 101778246 A | 7/2010 |
| CN | 101996407 A | 3/2011 |

OTHER PUBLICATIONS

Coughlan, J., et al., "Rapid and Robust Algorithms for Detecting Colour Targets," 10th Congress of the International Colour Association, AIC 2005, 2 pages.

(Continued)

*Primary Examiner* — Stella Woo
(74) *Attorney, Agent, or Firm* — Conley Rose, P.C.; Grant Rodolph; Brandt D. Howell

(57) ABSTRACT

A method comprising rendering a video display signal comprising combining local illumination video objects from different sources into each frame of a plurality of frames, wherein the local illumination video objects are video objects on which chromatic adaptation was performed using an illumination reference common to all video objects. An apparatus comprising a processor configured to render a video display signal comprising combining local illumination video objects from different sources into each frame of a plurality of frames, wherein the local illumination video objects are video objects on which chromatic adaptation was performed using an illumination reference common to all video objects.

27 Claims, 12 Drawing Sheets

(56) References Cited

OTHER PUBLICATIONS

Gijsenij, A., et al., "Computational Color Constancy: Survey and Experiments," IEEE Transactions on Image Processing, vol. 20, No. 9, Sep. 2011, pp. 2475-2489.

Ilie, A., et al., "Ensuring Color Consistency Across Multiple Cameras," Proceedings of the Tenth IEEE international Conference on Computer Vision (ICCV'05), 2005, 8 pages.

Kryszczuk, K., et al., "Color Correction for Face Detection Based on Human Visual Perception Metaphor," Proceedings of the Workshop on Multimodal User Authenication, 2003, pp. 138-143 pages.

Marguier, J., et al., "Assessing Human Skin Color from Uncalibrated Images," International Journal of Imaging Systems and Technology, 2007, pp. 143-151.

Xu, W., et al., "Performance Evaluation of Color Correction Approaches for Automatic Multi-View Image and Video Stitching," Proceedings of IEEE Conference on Computer Vision and Pattern Recognition, 2010, pp. 263-270.

Foreign Communication From a Counterpart Application, PCT Application PCT/CN2012/086176, International Search Report dated Mar. 14, 2013, 6 pages.

Foreign Communication From a Counterpart Application, PCT Application PCT/CN2012/086176, Written Opinion dated Mar. 14, 2013, 4 pages.

\* cited by examiner

COLOR CORRECTION FOR MULTIPLE VIDEO OBJECTS IN TELEPRESENCE APPLICATIONS

CROSS-REFERENCE TO RELATED APPLICATIONS

The present application claims priority to U.S. Provisional Patent Application No. 61/567,730 filed Dec. 7, 2011 by Cook, et al. and entitled "Color Correction for Multiple Video Objects in Telepresence Applications", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A human observer is equipped with the ability to assign colors to a given object under different illumination conditions. For example, most humans will assign a green color to grass at midday, when the main illumination is white sunlight, and also at sunset, when the main illumination is red. This ability of human perception system, which ensures that the perceived color of objects remains relatively constant under varying illuminations, may be referred to as color constancy. However, when grass images under different illuminations are viewed side-by-side, the difference in colors becomes more obvious to the human observer. When viewed in isolation without any background, the grass itself may not even appear green in color.

In digital image and video applications, computational color correction is sometimes used as an attempt to mimic the human ability to achieve color constancy. Color correction may comprise two steps: illumination estimation and chromatic adaptation. Illumination herein may refer to the application of a light source in an image or video scene. Illumination estimation may refer to the process of estimating the color, or spectral output, of the light source. This information may in turn be used to correct the color of the image or video to match a different illumination, the process of which may be referred to as chromatic adaptation.

Videoconferencing involving multiple users at remote locations is becoming increasingly popular. Telepresence is a term sometimes used to refer to video conferencing. In telepresence applications, a video object may refer to an area of interest in a video frame which comprises a human subject (foreground) separated from the surrounding environment (background). Multiple video objects from different sources may be transmitted to a common location in a telepresence system, where they may be received, processed and displayed together either with each video object in its individual background or with all video objects combined into a common background.

Telepresence users may likely have different illuminations at remote locations, unless special equipment such as controlled lighting rooms are used. In a telepresence system wherein each source video frame is complete and each video object may be perceived within its own background, the problem of perceived color differences between video objects may be somewhat minimal, since color constancy for a human observer is still preserved. However, the problem of perceived color differences may become significant in an immersive telepresence system that aims to create the virtual appearance of having all users situated in a same surrounding environment. In this paradigm, the original backgrounds from source video frames may be removed and video objects alone may be rendered onto a common background which may have an illumination different from each of the source video frames. Consequently, these video objects perceived side-by-side may not appear natural, as the color constancy model is no longer applicable.

To improve immersive telepresence, the color of multiple video objects in the same rendered frame may need to be consistent not only with each other but also with the common background, since brightness and/or color balance differences, however subtle, may be very noticeable. Color correction proves to be difficult in this case. Even if a white balance algorithm is implemented to correct the color of each entire video frame, this color correction may well not be the most appropriate color correction for each video object. Additionally, in an uncontrolled lighting environment—as may be found in a typical office or home, the color balance of a video object, as well as its perceived brightness, may change on a frame-by-frame basis. For example, movement by the video object in the foreground may occlude background light sources, and consequently change the illumination and/or the white balance of the video object. Thus, there remains a need to develop systems and/or methods of color correction to improve telepresence applications, such as immersive telepresence.

SUMMARY

In one embodiment, the disclosure includes an apparatus comprising a processor configured to render a video display signal comprising combining local illumination video objects from different sources into each frame of a plurality of frames, wherein the local illumination video objects are video objects on which chromatic adaptation was performed using an illumination reference common to all video objects.

In another embodiment, the disclosure includes a method comprising rendering a video display signal comprising combining local illumination video objects from different sources into each frame of a plurality of frames, wherein the local illumination video objects are video objects on which chromatic adaptation was performed using an illumination reference common to all video objects.

In yet another embodiment, the disclosure includes an apparatus comprising an ingress port configured to receive a plurality of video streams corresponding to a plurality of sources, wherein each video bitstream comprises a corresponding sequence of video objects; and a processor coupled to the ingress port and configured to perform chromatic adaptation on each sequence of video objects to generate a plurality of sequences of local illumination video objects, wherein the chromatic adaptation uses an illumination reference common to all video objects; and render a video display signal comprising a plurality of frames, wherein each frame comprises a combination of local illumination video objects from different sequences.

In yet another embodiment, the disclosure includes an apparatus comprising an ingress port configured to receive a plurality of video bitstreams corresponding to a plurality of sources, wherein each video bitstream comprises a corresponding sequence of video objects, wherein a portion of each video bitstream is based on a color target corresponding to the video bitstream, and wherein each video bitstream does not include its color target; and a processor coupled to the ingress port and configured to render a video display signal based on a combination of video objects from different sequences.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods for color correction in telepresence systems that lead to improved color consistency of multiple video objects. The color correction may be based on analysis of a video object and background which are segmented from a video frame. Alternatively, the color correction may be based on a color target placed in the background. By comparing the segmented color target with its known color values, an estimation of the illumination used in a scene may be obtained. The illumination information may be immediately used to correct the color of the video object to match a standard illumination. In an alternative approach, the illumination information generated from the color target may be transmitted as supplementary information and later used for chromatic adaptation. Multiple video objects from different sources may be transmitted over a network and received at a remote location of the telepresence system, where chromatic adaptation may be performed to match the color of video objects to a common local illumination. A rendering system may generate a video display signal comprising a combination of multiple video objects on a local background. The color target used for color correction does not need to be seen in the video display signal. The systems and methods may allow multiple video objects displayed side-by-side to have colors that are consistent not only with each other but also with the background. Thus, the experience of videoconferencing may be improved without requiring special equipment such as controlled lighting rooms.

Figure 1:
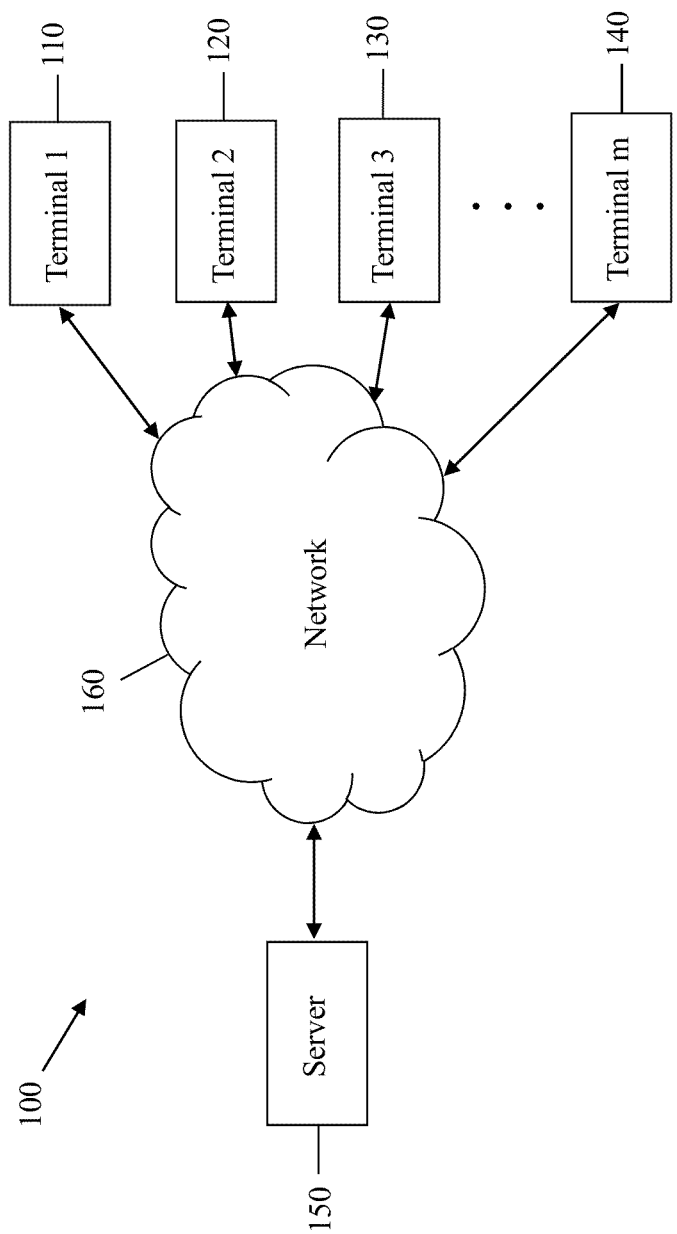
FIG. 1 is a schematic diagram of an embodiment of a telepresence architecture.

A schematic diagram of an embodiment of a telepresence architecture 100 is presented in FIG. 1. The telepresence architecture 100 may employ a client-server model comprising m terminals 110-140, where m is an integer greater than 1, connected to a server 150 via a network 160. The terminals 110-140 may each have at least one user, for a total of at least m different users. The terminals 110-140 may be configured to capture video frames, digitize the frames, and transmit digital video signals over the network 160 to the server 150. It should be noted that, although the present disclosure focuses mainly on video signals, audio and/or other supplemental signals may also be recorded, processed and transmitted in the telepresence architecture 100, in addition to or in conjunction with video signals in order to facilitate telepresence. The server 150 may be configured to receive digital video signals from each of the m terminals, process the video signals, and then transmit a video signal that may be some conversion of the m input signals back to each of the m terminals 110-140. The network 160 may be any combination of routers and other processing equipment necessary to transmit video signals between each of m terminals 110-140 and the server 150. The network 160 may, for example, be the public Internet or a local Ethernet network. The terminals 110-140 may be connected to the network 160 via wired or wireless links.

Figure 2:
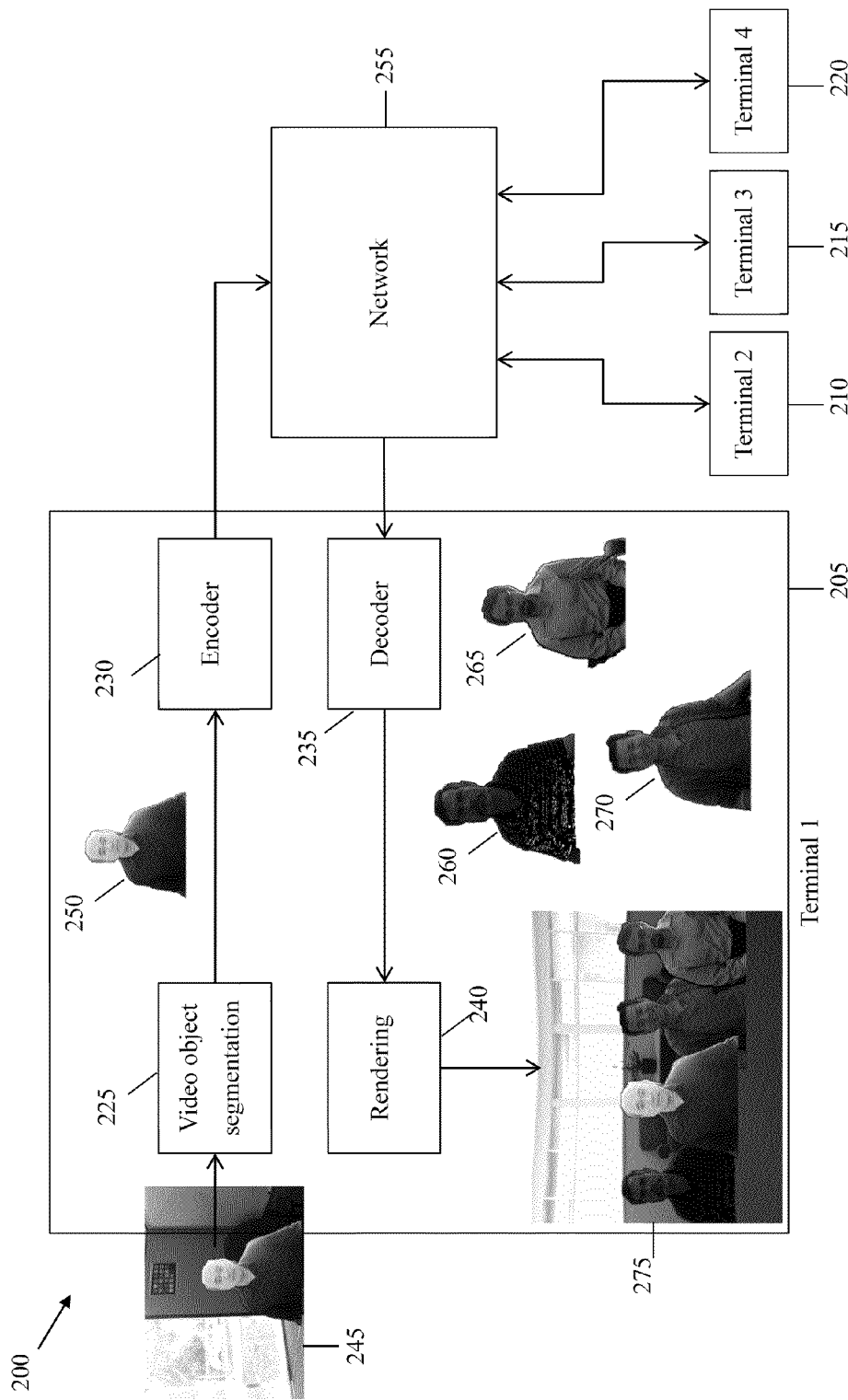
FIG. 2 is a schematic diagram of an embodiment of an immersive telepresence system based on a peer-to-peer model.

An alternative architecture for facilitating telepresence applications may be a peer-to-peer model comprising m terminals, in which each terminal communicates directly with the other m−1 terminals via a network. FIG. 2 is a schematic diagram of an embodiment of an immersive telepresence system 200 based on a peer-to-peer model. Suppose, for the purpose of illustration, that there are four terminals 205, 210, 215 and 220 each comprising at least one user attending a telepresence conference. The terminal 205 is used as an illustrative example, with the premise that descriptions regarding the terminal 205 may be equally applicable to any other terminal. The terminal 205 comprises a video object segmentation module 225, an encoder 230, a decoder 235, and a rendering module 240 arranged as shown in FIG. 2. The immersive telepresence system 200 is but one example of telepresence system and is used for illustrative purposes.

A video camera captures a sequence of video frames including video frame 245. Then, the video object segmentation module 225 may extract a video object 250—in this case color pixels representing the user from the video frame 245. The video object segmentation module 225 may employ any of a number of known video target detection and segmentation techniques. The encoder 230 may receive an uncompressed video signal and produce a compressed video signal. Encoding of the input video may occur on a frame-by-frame basis, which generates encoded video frames. Encoding may sometimes be referred to as compression, and decoding may sometimes be referred to as decompression.

In the peer-to-peer model 200, bitstream compressed by the encoder 240 may be transmitted from the terminal 205 via a network 255 and received by the other terminals 210-220. In the same manner, bitstreams from two or more of the other terminals 210-220 may also be transmitted via the network 255 and received by the terminal 205. Such a model does not require a centralized server for receiving all the video signals from the different terminals.

Upon receiving bitstreams from the other terminals 210-220, the decoder 235 in the terminal 205 may perform the inverse of the encoder 230 and decompress bitstreams back to an uncompressed format. The decoded signals may comprise sequences of video objects 260, 265 and 270 each corresponding to one of the terminals 210, 215, and 220. The rendering module 240 may then combine all sequences of video objects and generate a single sequence of video frames including video frame 275. The video frame 275 may be a display signal viewable by the user at the terminal 205. A local background may be added to the rendered video frame 275 to create the appearance of having all telepresence users in the same environment. It should be noted that other types of modules may also be included in the immersive telepresence system 200, such as transmitters, receivers, and video projectors.

If color correction is not performed or insufficiently performed in a telepresence system wherein multiple video objects are viewed side-by-side in the same background, the rendered video frame may often appear unnatural to a human observer. For example, in the immersive telepresence system 200, the video object 250 has a noticeably different brightness and color tone from the other video objects 260-270, since no color correction was performed in this case. To improve color consistency of video objects, the telepresence system 200 may need to include color correction modules.

Color correction may be implemented using a number of methods. For example, in one method, both a video object and the corresponding background may be analyzed for brightness and color variations due to changes or variations in illumination. If the average brightness and/or color of the pixels in the video object are different from the average of the pixels in the entire frame, the video object may be adjusted to have the mean of the entire video frame. An alternative method may take advantage of the fact that, in immersive telepresence applications, only video objects from different sources may be needed and individual backgrounds may be removed from the final display signal. Thus, a color target may be placed in view of the camera but away from potential video objects. It may serve as a color reference to improve color correction.

Figure 3:
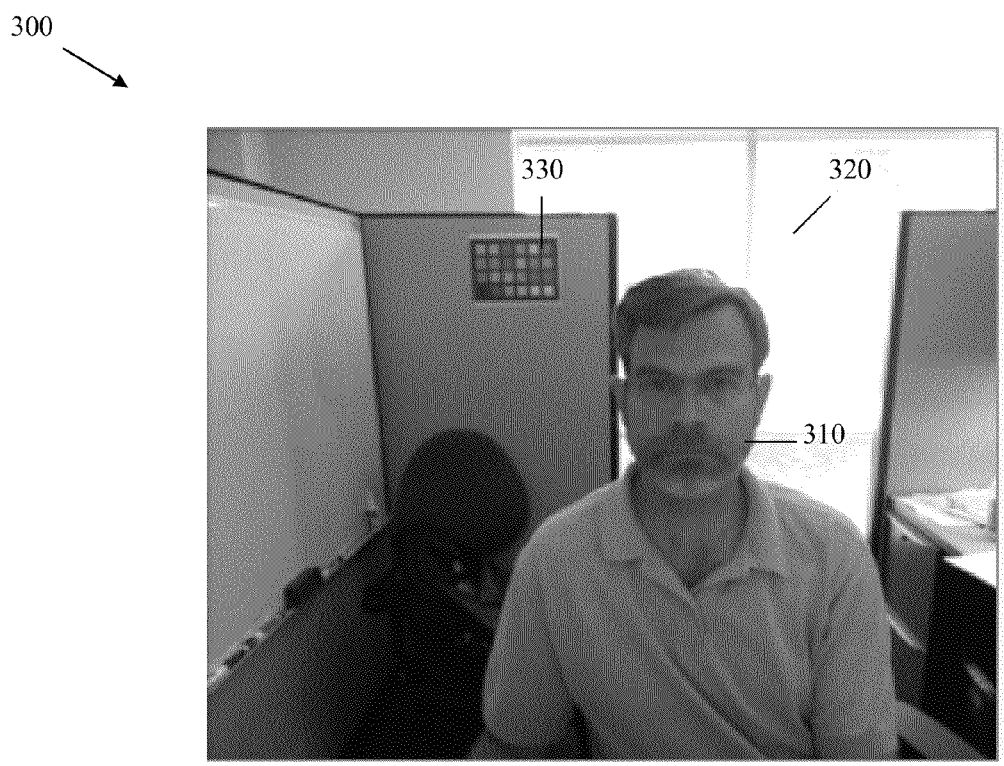
FIG. 3 is an image of an exemplary video frame using a color target.

FIG. 3 illustrates an image of an exemplary video frame 300. For illustrative purposes herein, the video frame 300 comprises a video object 310, a background 320, and a color target 330 which is placed in the background 320 next to the video object 310. The color target 330 may comprise an array of color blocks with known color values under an illumination condition widely recognized in the art of image and video processing. Since the color of video object 310 may be unknown, the color target 330 may be used to detect changes in the color compensation of the camera. In general, it may be difficult to estimate the illumination of a scene, for example, in uncontrolled illumination environments with multiple light sources, such as a typical office or home. Therefore, the use of a known color target in the scene may provide a more accurate and responsive method of color correction especially if the cameras are not calibrated.

As mentioned above, an immersive telepresence system may not need the background 320 from the video frame 300 in the final display signal. Consequently, the color target 330 placed in the background 320 may be removed from the final display signal so as to not be seen by other users and cause any unwanted distraction. This invisibility of color target 330 in the final display signal may allow its location to be somewhat flexible within view of the camera. The flexibility may prove advantageous, for example, when the location and/or angle of the camera need to be changed to compensate for height variations of different human subjects.

The detection and segmentation of color targets, such as the color target 330, may employ the same techniques as the detection and segmentation of video objects, such as the video object 310. Due to the structured nature of color targets, their detection and segmentation may be made very fast according to article entitled "Rapid and Robust Algorithms for Detecting Colour Targets," by J. Coughlan, R. Manduchi, M. Mutsuzaki, and H. Shen in *proceedings of the 10th Congress of the International Colour Association, 2005 (AIC Colour 05)*, pp. 328-331, which is hereby incorporated by reference. In a telepresence system, occasional occlusion of a color target by a video object may occur. This issue may be overcome by simply keeping the previously determined color correction parameters until the color target is reacquired. In the event that a color target is unable to be acquired by the system, or the acquired data is insufficient for proper color correction, a user may be advised of this issue so that the user can make changes to the local environment. For example, the user may move relative to the color target so as to not obscure the color target.

Figure 4:
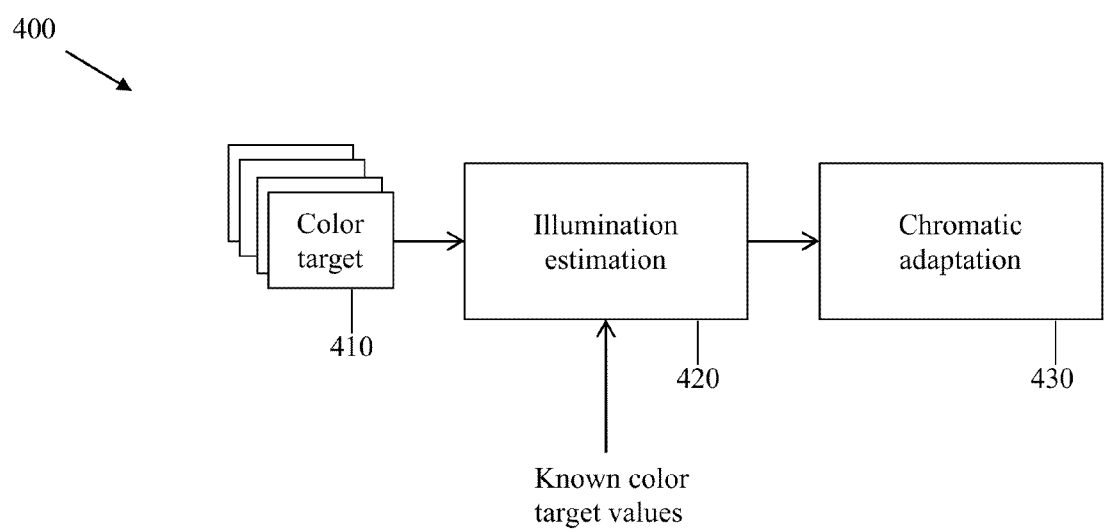
FIG. 4 is a block diagram of an embodiment of a color target-based color correction architecture.

FIG. 4 is a block diagram of an embodiment of a color target-based color correction architecture 400. The color correction architecture 400 comprises a color target 410, an illumination estimation module 420, and a chromatic adaptation module 430. One or more color targets 410 may be used in a video frame. Information of the color target 410 may feed into the illumination estimation module 420. The illumination estimation module 420 may compare the projected color values of the color target 410 with its known values, and thereby generate an estimate of the illumination used to generate the video frame. Then, the chromatic adaptation module 430 may in turn use the illumination information to adapt the white balance of a video frame or a video object to better fit a different illumination.

The number, shape, size, and gamut of a color target may be application dependent. For example, in a telepresence system, it is likely that a small color shift for video objects not previously seen by remote users would only be a minor annoyance in most situations. Due to the extreme sensitivity of a human observer to skin color and a perceived "baseline" for a variety of skin tones, however, skin tone errors may become immediately observable, especially in a video object paradigm wherein multiple faces may be perceived side-by-side without a respective background for each face to maintain color constancy. Therefore, for the case of video objects being the segmentation of human subjects, a color target may change from a complete color gamut to a much tighter gamut which only encompasses the extent of brightness and chromaticity (i.e. color) which exist in skin tones according to articles entitled "Color Correction for Face Detection Based on Human Visual Perception Metaphor," by K. Kryszczuk and A. Drygajlo in *Proceedings of the Workshop on Multimodal User Authentication*, 2003, pp. 138-143, and "Assessing Human Skin Color from Uncalibrated Images," by J. Marguier, N. Bhatti, H. Baker, M. Harville, and S. Susstrunk in *International Journal of Imaging Systems and Technology*, vol. 17 no. 3, pp. 143-151, 2007, and "Performance Evaluation of Color Correction Approaches for Automatic Multiview Image and Video Stitching," by W. Xu and J. Mulligan in *Proceedings of the 23rd IEEE Conference on Computer Vision and Pattern Recognition*, 2010, pp. 263-270, which are hereby incorporated by reference.

With the use of a skin gamut, while it is possible that the overall color correction may be poorer, the critical skin tone color correction will improve and thus enhance the overall impression of an immersive telepresence experience. In addition, since the process of video object segmentation for telepresence may typically locate a human face, in order to avoid odd color shifts—which may be visually fine for skin tones—chromatic adaptation may also be targeted to just skin pixels.

The illumination estimation module 420 and chromatic adaptation module 430 may be implemented via any number of conventional algorithms. The accuracy, responsiveness, and complexity of the algorithms may be application dependent. For example, it is possible to use a low-complexity diagonal 3×3 matrix to implement the chromatic adaptation module 430, but more complicated color appearance models such as CIECAM02, which is defined by the International Commission on Illumination (usually abbreviated CIE for its French name, Commission internationale de l'éclairage), may have the capability to improve the overall appearance of the video object to a human observer, according to article entitled "Computational Color Constancy: Survey and Experiments," by A. Gijsenij, T. Gevers, and J. van de Weijer in *IEEE Transactions on Image Processing*, vol. 20, no. 9, pp. 2475-2489, 2011, which is hereby incorporated by reference. For more examples of color correction implementation via a known color target, please also refer to article entitled "Ensuring Color Consistency Across Multiple Cameras," by A. Ilie and G. Welch in *Proceedings of the 10th IEEE International Conference on Computer Vision*, 2005, pp. 1268-1275, which is hereby incorporated by reference.

Figure 5:
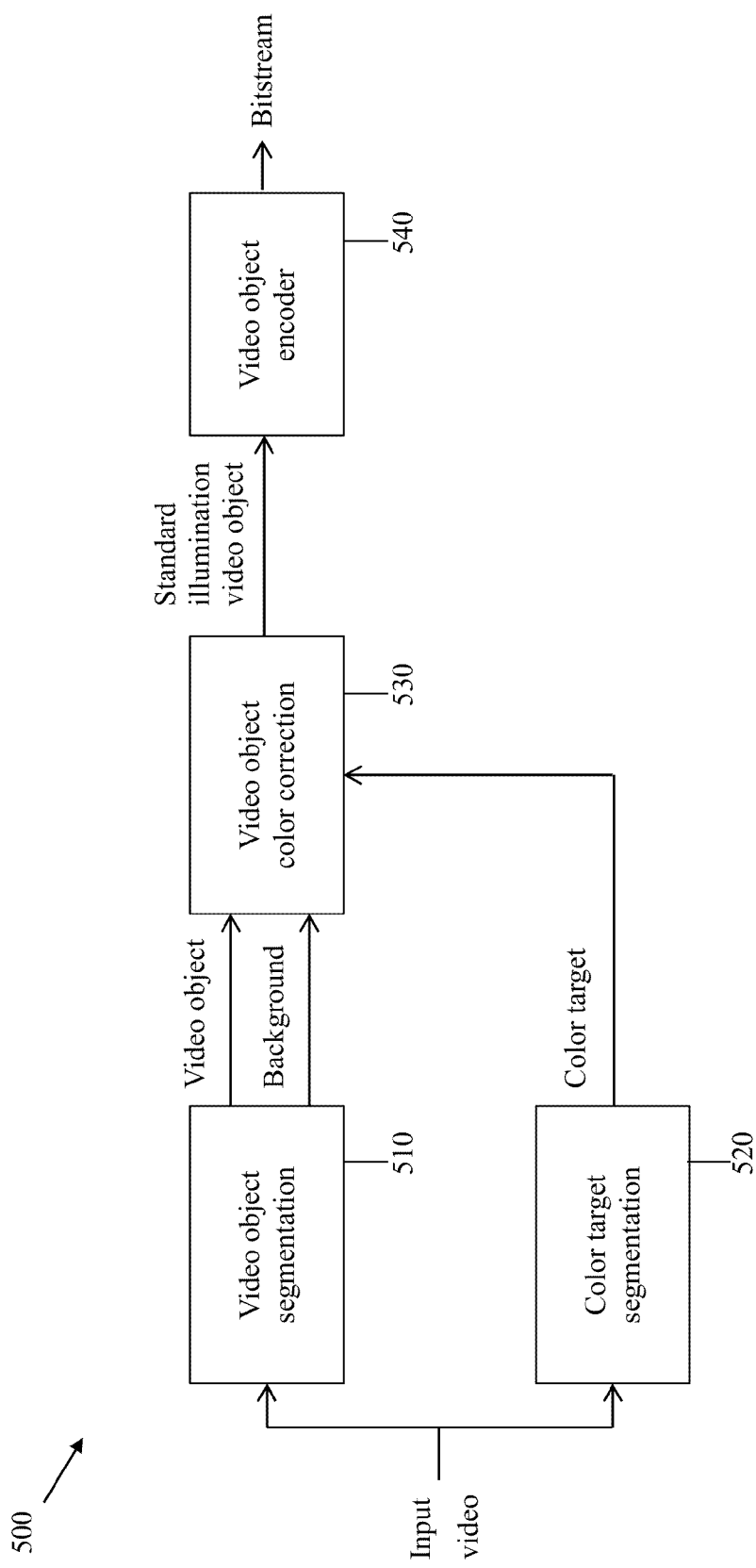
FIG. 5 is a schematic diagram of an embodiment of a video object encoding system with color correction to a standard illumination.

FIG. 5 is a schematic diagram of an embodiment of a video object encoding system 500 with color correction to a standard illumination. The video object encoding system 500 comprises a video object segmentation module 510, a color target segmentation module 520, a video object color correction module 530, and a video object encoder 540 arranged as shown in FIG. 5. An input video signal comprising a sequence of video frames may first feed into the video object encoding system 500. The video object segmentation module 510 may be configured to analyze the pixels of the input video, identify the areas of interest as video object and extract these pixels from the other pixels of the frame which are regarded as the background. The video object segmentation module 510 may be the same as the video object segmentation module 225 in FIG. 2.

The color target segmentation module 520 may extract pixels representing a color target from the input video signal. The detection and segmentation of the color target segmentation module 520 may be similar with that of the video object segmentation module 510. The video object color correction module 530 may correct the color of a video object to better match a different illumination whenever necessary. Its implementation may employ any of a number of known algorithms. For example, as described previously, the video object color correction module 530 may perform analysis of the brightness and/or color changes of the video object and background, which may be produced by the video object segmentation module 510. If the average of the video object is different from the average of the entire frame, the video object may then simply be adjusted to have the mean of the entire frame.

Alternatively, the video object color correction module 530 may use color target information from the color target segmentation module 520. Based on the known values of the color target, a local illumination used in generating the input video may be accurately estimated. This illumination information in turn may be applied onto the video object to adapt its chromaticity to match another illumination. In this case, the video object color correction module 530 may be represented by descriptions with respect to FIG. 4.

A video object may be corrected to match a standard illumination which may refer to the lighting condition in a scene with an illuminant that is widely recognized in the art of image and video processing. An exemplary standard illuminant may be the Standard Illuminant D65, defined by the CIE, which corresponds to a midday sun in Western Europe. In contrast to a standard illumination, a local illumination may refer to the application of one or more light sources used to record a video in a local environment.

The video object encoder 540 may receive a standard illumination video object and compress it into a digitized bitstream. The video object encoder 540 may be the same as the encoder 230 in FIG. 2. The encoded bitstream may be transmitted over a network from a terminal to a server in a client-server model or to another terminal in a peer-to-peer model.

Figure 6:
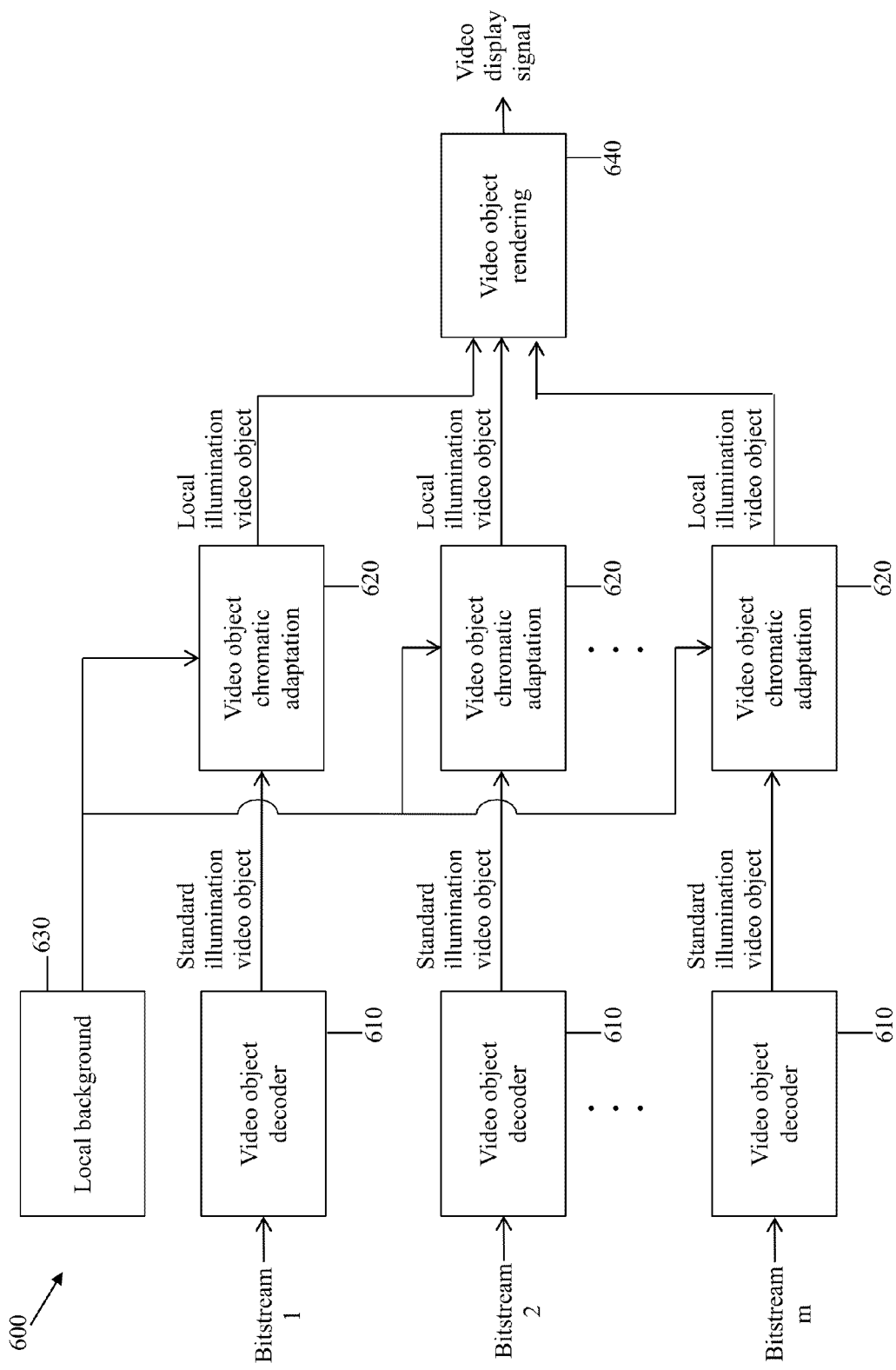
FIG. 6 is a schematic diagram of an embodiment of a video object rendering system using standard illumination video objects.

FIG. 6 is a schematic diagram of an embodiment of a video object rendering system 600 using standard illumination video objects. The video object rendering system 600 comprises m video object decoders 610, m video object chromatic adaptation modules 620, a local background 630, and a video object rendering module 640 as arranged in FIG. 6, where m is an integer greater than 1. Video bitstreams from m terminals may be presented to the video object rendering system 600 for processing. The video bitstreams may be obtained by serial-to-parallel conversion of a bitstream that may be received serially. For example, in a client-server model, a bitstream carrying encoded video signals from m terminals, such as the m terminals 110-140 in FIG. 1, may be received by a server, such as the server 150 in FIG. 1, in a serial bitstream, and the video object rendering system 600 may be implemented in the server. Alternatively, in a peer-to-peer model, a variant of the video object rendering system 600 may be implemented in each terminal. Each bitstream may feed into its corresponding video object decoder 610. The video object encoder 610 may decompress its bitstream, recovering it to an uncompressed video signal which comprises a sequence of standard illumination video objects.

The video object chromatic adaptation module 620 may adapt the chromaticity of a standard illumination video object to match the illumination of the local background 630. Since the color of standard illumination video objects from all m sources may already be consistent, after the implementation of the video object chromatic adaptation module 620 using a local illumination common to all video objects, the color of all local illumination video objects may remain consistent. The video object chromatic adaptation module 620 may use implementation techniques described previously.

It should be noted that video object chromatic adaptation module 620 may be omitted if the standard illumination video objects were already acceptable to telepresence users in terms of color consistency without further chromatic adaptation, or if the local background 630 was already converted to have a standard illumination. This may help reduce the computational burden of the video object rendering system 600 since the color of each video object would still remain consistent with each other.

The video object rendering module 640 may be configured to combine two or more local illumination video objects and generate a video display signal comprising a sequence of video frames. Each frame may comprise a combination of multiple video objects. The rendered video display signal may be transmitted to each of the m terminals. The video object rendering module 640 may be the same with rendering module 240 in FIG. 2.

Alternatively, the video object rendering module 640 may be configured to display multiple video display signals. Each display signal may comprise a sequence of video frames comprising one or more local illumination video objects. Since all video objects may now have consistent color with each other, even when displayed in separate frames side-by-side, they may appear natural to a user.

The local background 630 may also be added to the rendered video display signal to create the appearance of all telepresence users being in the same environment. The local background 630 may be any real environment, such as an office or conference room, or it may be any imaginary or virtual environment that can be generated by a computer system, such as the surface of mars or the bottom of an ocean. Further, the local background 630 may be customizable for users at different terminals. For example, if the user at the terminal 205 in FIG. 2 wishes to have the local background 630 customized to his preference, he may have the option to perceive users in a background that differs from the backgrounds other users may see.

In a client-server model, the video object rendering system 600 may be implemented in a server, such as the server 150 in FIG. 1. Alternatively, in a peer-to-peer model, the video object rendering system 600 may be implemented in any terminal, such as the terminal 205 in FIG. 2. The video object rendering system 600 may include customizable features for users at different terminals. For example, if the user at the terminal 205 in FIG. 2 does not wish to see himself seated side-by-side with others, the video object rendering system 600 may be configured to exclude him from the video signal displayed on his end.

The video object rendering system 600 may comprise less than m video object decoders 610 and video object chromatic adaptation modules 620 for m incoming bitstreams. Multiple sequences video objects may feed into a common processing module. For example, given sufficient computing speed and power, one common video object decoder 610 and video object chromatic adaptation module 620 may be used for all m bitstreams.

As discussed previously, color correction may comprise illumination estimation and chromatic adaptation. Depending on application, these two steps may be implemented either at a same location or at different locations. For example, in a video object encoding system, such as the video object encoding system 500 in FIG. 5, both illumination and chromatic adaptation are performed resulting in at least one standard illumination video object. In a corresponding video object rendering system, such as the video object rendering system 600 in FIG. 6, chromatic adaptation may be performed again on video objects converting them from a standard illumination to a local illumination.

Alternatively, illumination estimation may be completed at a location, such as the terminal 110 in FIG. 1. Illumination information generated by illumination estimation may be transmitted over a network as supplementary information separate from video object bitstreams to a different location. For example, bitstreams carrying illumination information may be received by a server, where chromatic adaptation may then be completed, converting video objects from different source illuminations directly to a common local illumination. This alternative approach is discussed in more details below.

Figure 7:
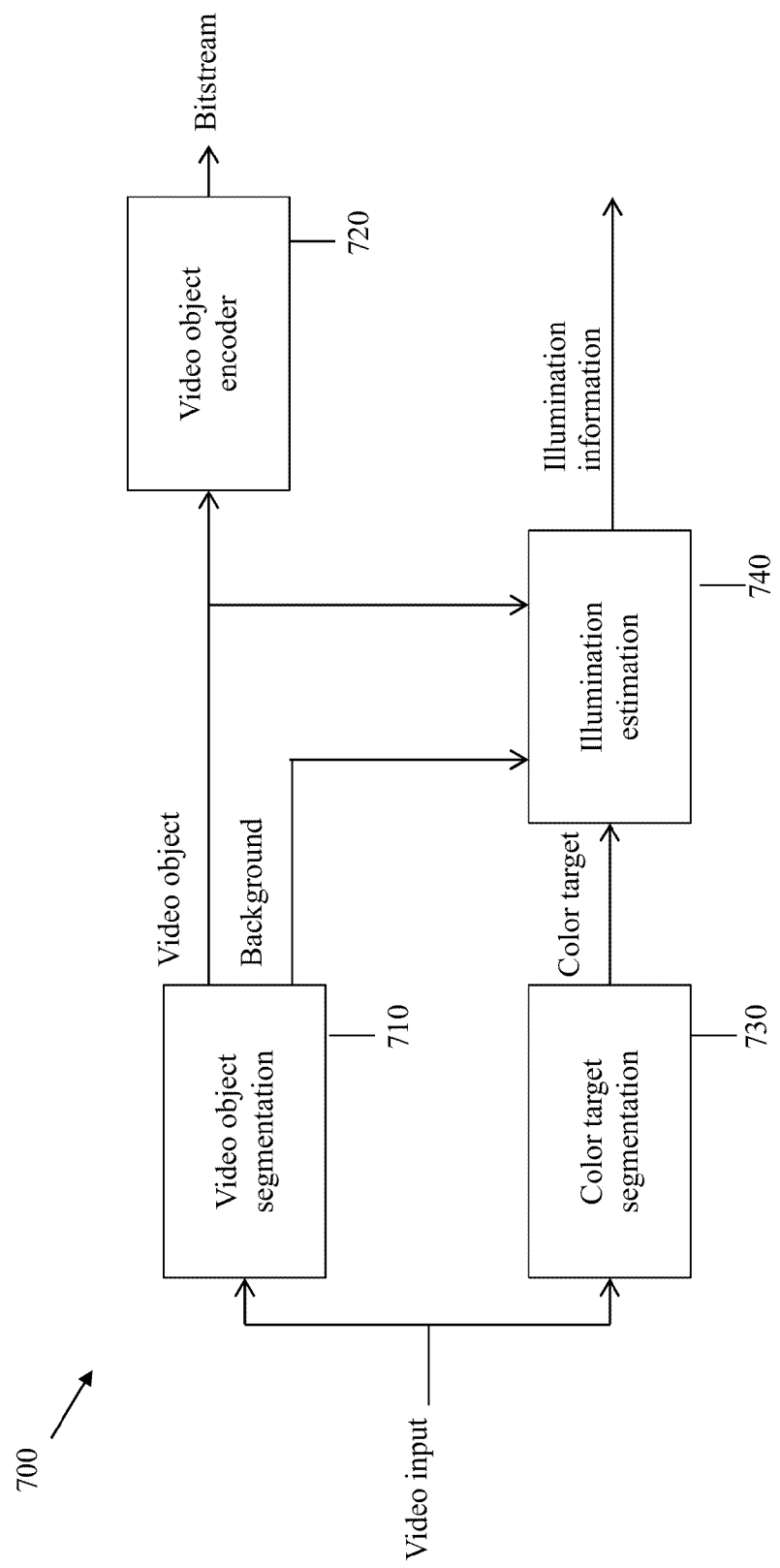
FIG. 7 is a schematic diagram of an embodiment of a video object encoding system using supplementary illumination information.

FIG. 7 is a schematic diagram of an embodiment of a video object encoding system 700 using supplementary illumination information. The video object encoding system 700 comprises a video object segmentation module 710, a video object encoder 720, a color target segmentation module 730, an illumination estimation module 740 arranged as shown in FIG. 7. The video object segmentation module 710 may be configured to extract the video object and background from an input video. The video object encoder 720 may then directly compress the video object signal into an encoded bitstream.

The color target segmentation module 730 may extract the color target from an input video. Color target information may then feed into the illumination estimation module 740 which may be implemented using techniques described previously. The illumination estimation module 740 may produce a bitstream carrying illumination information of the scene. This supplementary bitstream may then be transmitted over a network separate from the other video bitstream. Alternatively, other algorithms, such as analysis of video object and background, may be used to assess illumination information in the illumination estimation module 740.

Figure 8:
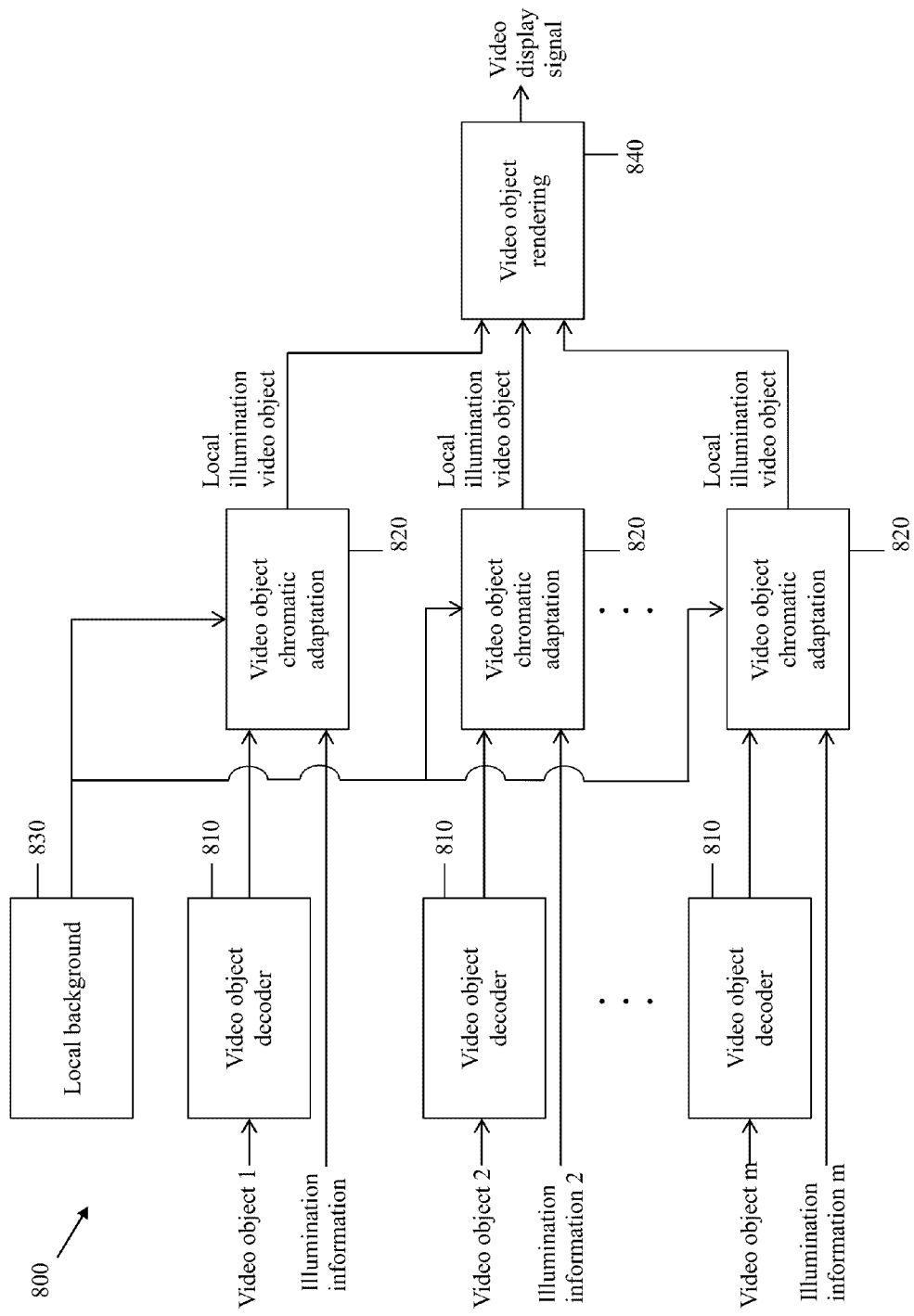
FIG. 8 is a schematic diagram of an embodiment of a video object rendering system using supplementary illumination information.

FIG. 8 is a schematic diagram of an embodiment of a video object rendering system 800 using supplementary illumination information. The video object rendering system 800 comprises m video object decoders 810, m video object chromatic adaptation modules 820, a local background 830, and a video object rendering module 840 as arranged in FIG. 8. Two correlated bitstreams from each of m terminals may be presented to the video object rendering system 800 for processing. A first video bitstream carrying a sequence of video objects may feed into a video object decoder 810. A second bitstream carrying supplementary illumination information may feed into the video object chromatic adaptation module 820. The illumination information may provide an estimate of one or more light sources used to generate the source video frames.

Using supplementary illumination information, the video object chromatic adaptation module 820 may directly adapt the chromaticity of a video object to match the illumination of the local background 830. Since a degree of chromatic adaptation may be different for video objects from different terminals, depending at least in part on the source illumination, after the implementation of the video object chromatic adaptation module 820, the video objects from different terminals may have colors consistent with each other. The video object rendering module 840 may combine a portion or all of m local illumination video objects together with the local background 830 and generate a sequence of video frames viewable by a user. The video object rendering module 840 may be the same with the video object rendering module 640 in FIG. 6.

Figure 9:
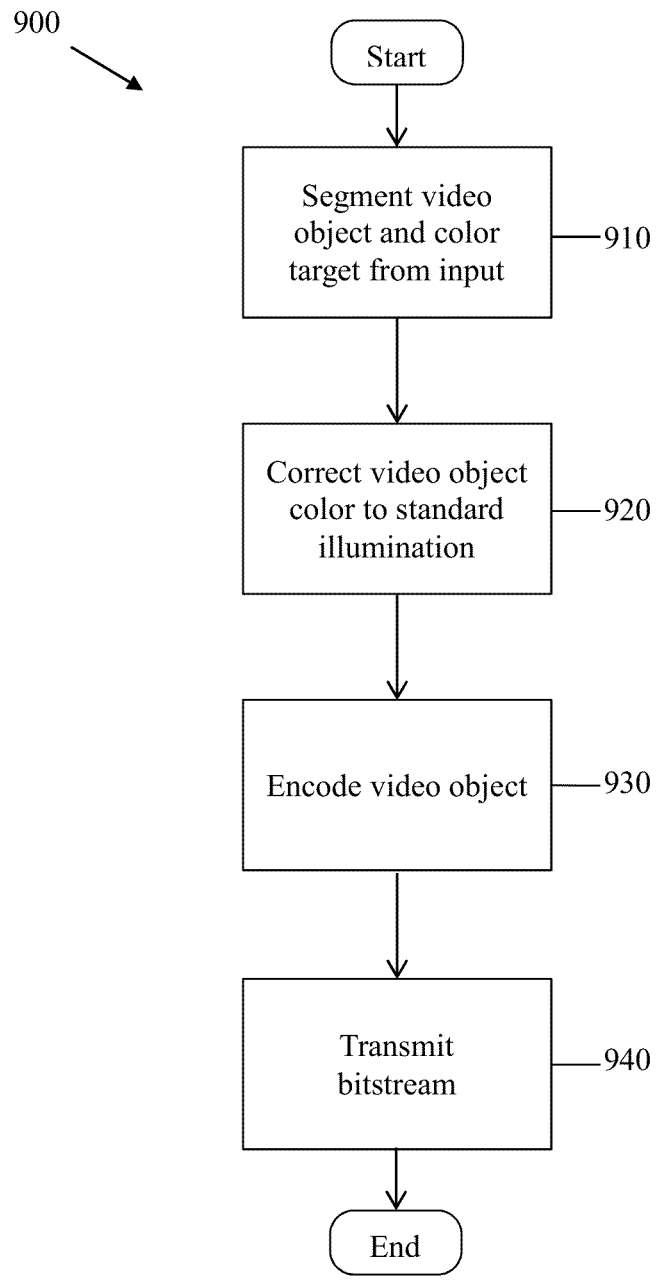
FIG. 9 is a flowchart of an embodiment of a video object encoding method using color correction based on a color target.

FIG. 9 is a flowchart of an embodiment of a video object encoding method 900 using color correction based on a color target. Method 900 begins in step 910, in which a video object and a color target are segmented from a sequence of video frames captured by a camera. Next in step 920, the color of the video object is corrected to match a standard illumination using any of a number of known illumination estimation and chromatic adaptation techniques. Next in step 930, the standard illumination video object is encoded into a compressed bitstream which is then, in step 940, transmitted over a network via a conventional transmitter.

Figure 10:
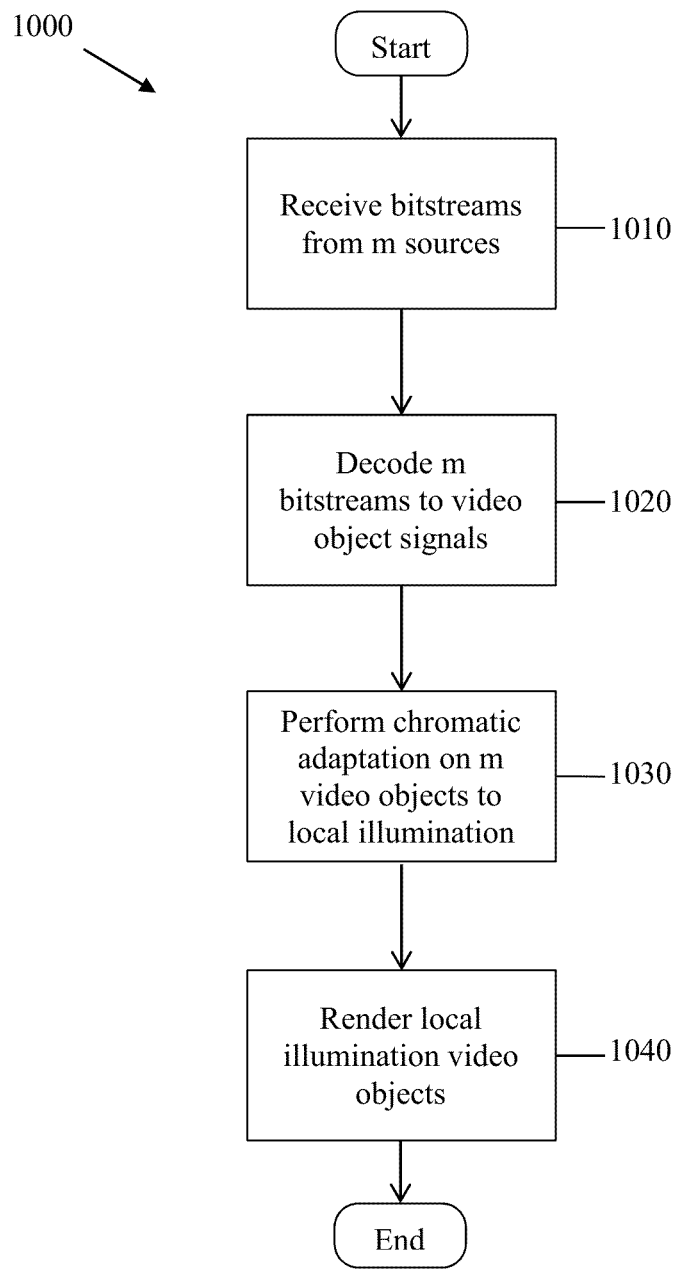
FIG. 10 is a flowchart of an embodiment of a video object rendering method 1000 using standard illumination video objects.

FIG. 10 is a flowchart of an embodiment of a video object rendering method 1000 using standard illumination video objects. Method 1000 begins in step 1010, in which bitstreams, generated by the execution of multiple video object encoding methods 900 in different source terminals, may be received via a conventional receiver. The bitstreams may carry compressed signals comprising standard illumination video objects from. Next in step 1020, each bitstream may be decoded to recover standard illumination video objects to an uncompressed form. Next in step 1030, chromatic adaptation may be performed on m sequences of video objects, converting their colors from a standard illumination to a local illumination. In case the color consistency of standard illumination video objects is already acceptable to telepresence users without further conversion to local illumination, step 1030 may be skipped. Next in step 1040, local illumination video objects from m different sources may be rendered together with the addition of a local background. The step 1040 may produce a video display signal comprising a sequence of video frames and each frame may comprise m video objects arranged side-by-side.

Overall, using the systems and/or methods of color correction disclosed herein, a video display signal comprising multiple video objects rendered onto a common background may appear natural to a human observer. The video objects may be corrected to achieve color consistency not only with each other but also with the local background. The improved color performance may allow users of a telepresence system to feel more comfortable and engaged, without requiring expensive equipment such as special controlled lighting rooms.

Figure 11:
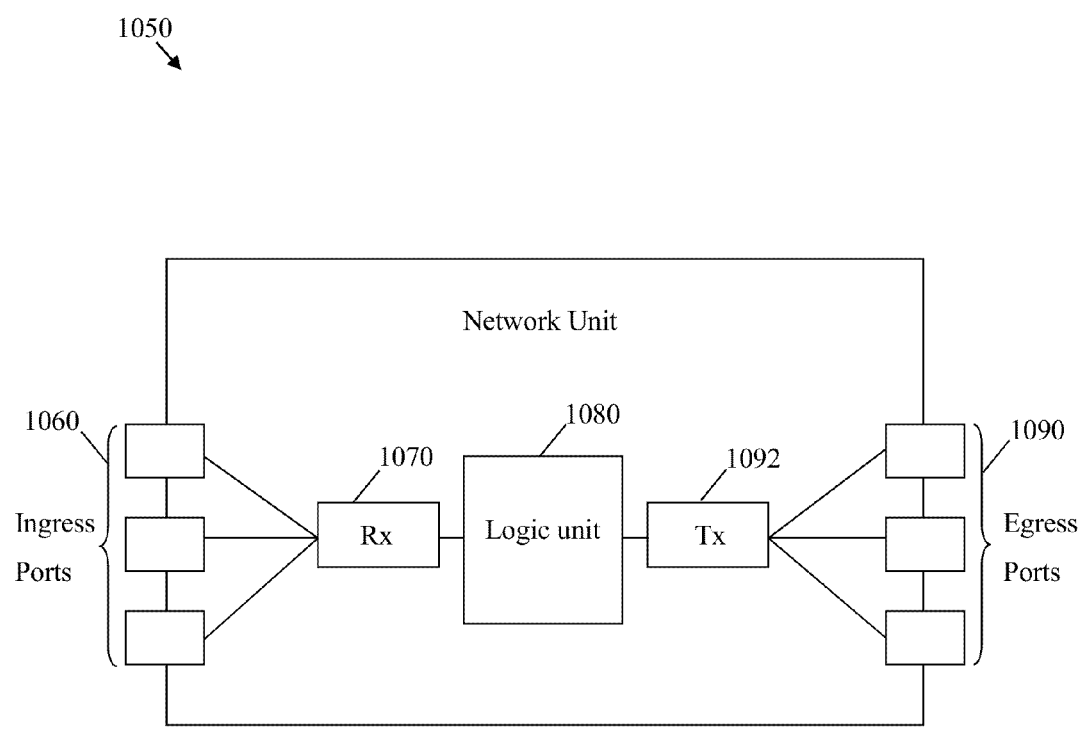
FIG. 11 is a schematic diagram of an embodiment of a network unit.

FIG. 11 illustrates an embodiment of a network unit 1050. The network unit 1050 may be any device that is interconnected with a network for receiving data and transmitting data. For instance, the network unit 1050 may be a server or other type of terminal. The network unit 1050 may comprise one or more ingress ports or units 1060 coupled to a receiver (Rx) 1070 for receiving signals and frames/data from other network components. The network unit 1050 may comprise a logic unit 1080 that determines which network components to which data is sent. The logic unit 1080 may be implemented using hardware, software, or both. The network unit 1050 may also comprise one or more egress ports or units 1090 coupled to a transmitter (Tx) 1092 for transmitting signals and frames/data to the other network components. The components of the network unit 1050 may be arranged as shown in FIG. 11.

The network unit 1050 may be located in a terminal or server, such as terminals 110-140 and server 150 in FIG. 1 or terminals in a peer-to-peer architecture, which was discussed earlier. The server 150 may, for example, receive video signals from terminals 110-140 via one or more ingress ports 1060, and may transmit information, such as a rendered video signal, to one or more of the terminals 110-140 via one or more egress ports 1090.

Figure 12:
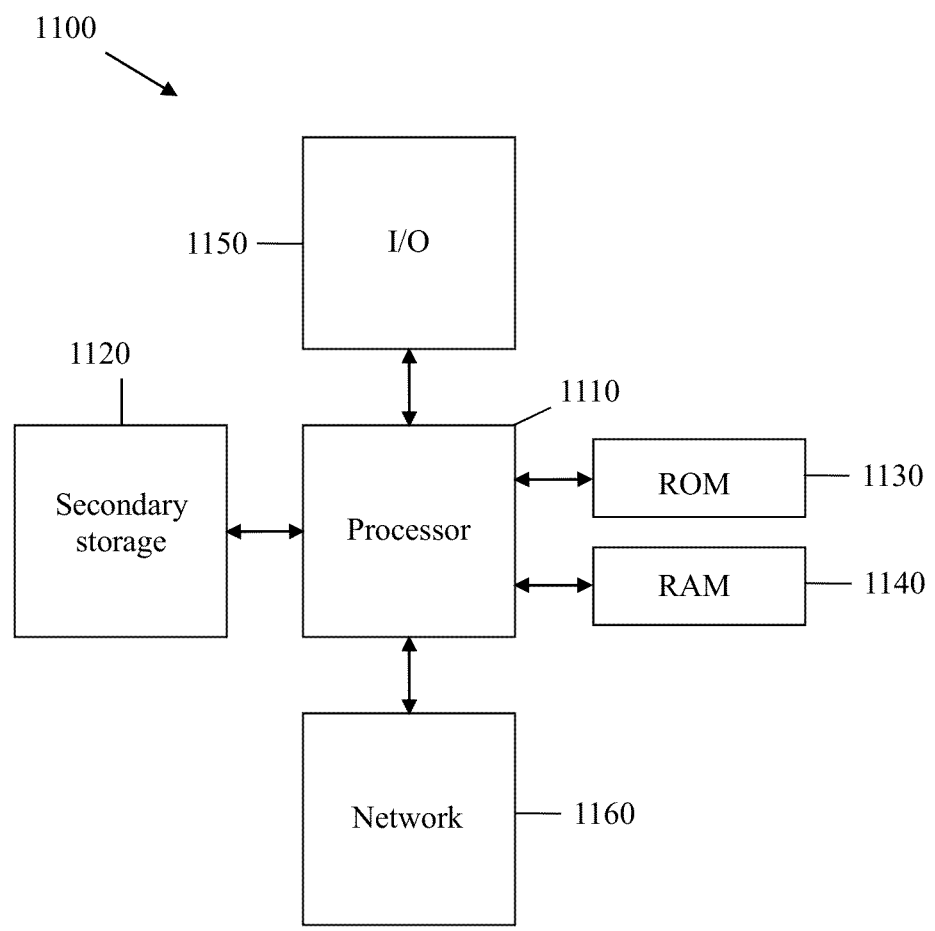
FIG. 12 is a schematic diagram of an embodiment of a general-purpose computer system.

Various systems and methods described above may be implemented on any general-purpose network component, such as a computer or network component with sufficient processing power, memory resources, and network throughput capability to handle the necessary workload placed upon it. FIG. 12 illustrates a typical, general-purpose network component or computer system 1100 suitable for implementing one or more embodiments of the components disclosed herein, such as portions of terminals or servers discussed above. The network component 1100 comprises a processor 1110 (which may be referred to as a central processor unit or CPU) that is in communication with memory devices including a secondary storage 1120, a read only memory (ROM) 1130, a random access memory (RAM) 1140, input/output (I/O) devices 1150, and network connectivity devices 1160. The processor 1110 may be implemented as one or more CPU chips, one or more cores (a processor with more than one core may be referred to as a multi-core processor), one or more application specific integrated circuits (ASICs), and/or one or more digital signal processors (DSPs). Further, the processor 1110 may be part of one or more ASICs and/or DSPs. The processor 1110 may implement some or all of the methods, encoders, decoders, modules, and systems discussed previously with respect to FIGS. 4-11. For example, the processor 1110 may be programmed or configured to implement some or all of the following components comprising the video object encoding system 500: video object segmentation module 510, color target segmentation module 520, video object color correction module 530, or video object encoder 540. Further, the I/O devices 1150 may comprise a computer monitor, such as a liquid crystal display (LCD), for displaying video signals.

The secondary storage 1120 is typically comprised of one or more disk drives or erasable programmable ROM (EPROM) and is used for non-volatile storage of data. The secondary storage 1120 may be used to store programs that are loaded into the RAM 1140 when such programs are selected for execution. The ROM 1130 is used to store instructions and perhaps data that are read during program execution. The ROM 1130 is a non-volatile memory device that typically has a small memory capacity relative to the larger memory capacity of the secondary storage 1120. The RAM 1140 is used to store volatile data and perhaps to store instructions. Access to both the ROM 1130 and RAM 1140 is typically faster than to the secondary storage 1120.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method comprising:
   receiving a plurality of video bitstreams corresponding to different sources, wherein each video bitstream comprises a corresponding sequence of video objects;
   performing chromatic adaptation on each sequence of video objects to generate local illumination video objects, wherein chromatic adaptation comprises adapting a chromaticity of each video object to match an illumination of a local background by employing an illumination reference common to all video objects; and
   rendering a video display signal comprising combining the local illumination video objects from the different sources into each frame of a plurality of frames.

2. The method of claim 1, wherein each video bitstream comprises a corresponding sequence of standard illumination video objects, wherein the standard illumination video objects are video objects on which color correction was performed using an illumination reference common to all the different sources, and wherein the local illumination video objects comprise the standard illumination video objects.

3. The method of claim 2, wherein the color correction is based on a color target for each video bitstream, and wherein each video bitstream does not include its color target.

4. The method of claim 2, wherein the color correction on the sequence of video objects is based on a plurality of frames corresponding to the sequence of video objects, wherein each frame comprises a background corresponding to the video object, and wherein the color correction is based on analysis of the video object and background.

5. The method of claim 1, further comprising receiving a plurality of illumination bitstreams corresponding to the different sources, wherein each illumination bitstream comprises a sequence of illumination information, wherein each sequence of illumination information corresponds to a sequence of video objects from a common source, wherein the illumination information is based on a plurality of frames from the common source, and wherein chromatic adaptation for each sequence of video objects is based on corresponding illumination information.

6. The method of claim 1, wherein each video bitstream comprises a corresponding sequence of standard illumination video objects, wherein the standard illumination video objects are video objects on which color correction has been performed using an illumination reference common to all the different sources, and wherein the local illumination video objects are standard illumination video objects.

7. The method of claim 1, further comprising selecting the background from a plurality of available backgrounds, wherein rendering the video display signal further comprises placing the background in each frame of the plurality of frames.

8. An apparatus comprising:
   an ingress port configured to receive a plurality of video bitstreams corresponding to a plurality of different sources, wherein each video bitstream comprises a corresponding sequence of video objects;
   a processor coupled to the ingress port and configured to:
      perform chromatic adaptation on each sequence of video objects to generate local illumination video objects, wherein chromatic adaptation comprises adapting a chromaticity of each video object to match an illumination of a local background by employing an illumination reference common to all video objects; and
      render a video display signal by combining the local illumination video objects from the different sources into each frame of a plurality of frames.

9. The apparatus of claim 8, wherein each received video bitstream comprises a corresponding sequence of standard illumination video objects, wherein the standard illumination video objects are video objects on which color correction was performed using an illumination reference common to all the different sources, and wherein the local illumination video objects comprise the standard illumination video objects.

10. The apparatus of claim 9, wherein the color correction is based on a color target for each video bitstream, and wherein each video bitstream does not include its color target.

11. The apparatus of claim 9, wherein the color correction on the sequence of video objects is based on a plurality of frames corresponding to the sequence of video objects, wherein each frame comprises a background corresponding to the video object, and wherein the color correction is based on analysis of the video object and background.

12. The apparatus of claim 8, wherein the ingress port is further configured to receive a plurality of illumination bitstreams corresponding to the different sources, wherein each illumination bitstream comprises a sequence of illumination information, wherein each sequence of illumination information corresponds to a sequence of video objects from a same source, wherein the illumination information is based on a plurality of frames from the same source, and wherein chromatic adaptation for each sequence of video objects is based on corresponding illumination information.

13. The apparatus of claim 12, wherein the illumination information for each illumination bitstream is based on a color target for the corresponding video bitstream, and wherein no color target is included in any bitstream or video bitstream.

14. The apparatus of claim 12, wherein each frame from a source comprises a background and a video object, and wherein the illumination information for a plurality of frames is based on an analysis of at least one video object and at least one background.

15. The apparatus of claim 8, wherein each video bitstream comprises a corresponding sequence of standard illumination video objects, wherein the standard illumination video objects are video objects on which color correction has been performed using an illumination reference common to all the different sources, and wherein the local illumination video objects are standard illumination video objects.

16. The apparatus of claim 15, wherein the color correction is based on a color target for each video bitstream, and wherein each video bitstream does not include its color target.

17. The apparatus of claim 15, wherein the color correction on the sequence of video objects is based on a plurality of frames corresponding to the sequence of video objects, wherein each frame comprises a background corresponding to the video object, and wherein the color correction is based on analysis of the video object and background.

18. The apparatus of claim 8, wherein the processor is further configured to select the background from a plurality of available backgrounds, wherein rendering the video display signal further comprises placing the background in each frame of the plurality of frames.

19. An apparatus comprising:
an ingress port configured to receive a plurality of video bitstreams corresponding to a plurality of sources, wherein each video bitstream comprises a corresponding sequence of video objects; and
a processor coupled to the ingress port and configured to:
perform chromatic adaptation on each sequence of video objects to generate a plurality of sequences of local illumination video objects, wherein chromatic adaptation comprises adapting a chromaticity of each video object to match a predetermined illumination by employing an illumination reference common to all video objects; and
render a video display signal comprising a plurality of frames, wherein each frame comprises a combination of local illumination video objects from different sequences.

20. The apparatus of claim 19, wherein the video objects are standard illumination video objects on which color correction was performed using an illumination reference common to all the sources.

21. The apparatus of claim 20, wherein the color correction is based on a color target for each video bitstream, and wherein each video bitstream does not include its color target.

22. The apparatus of claim 20, wherein the color correction on the sequence of video objects is based on a plurality of frames corresponding to the sequence of video objects, wherein each frame comprises a background corresponding to the video object, and wherein the color correction is based on analysis of the video object and background.

23. The apparatus of claim 19, wherein the ingress port is further configured to receive a plurality of illumination bitstreams corresponding to the different sources, wherein each illumination bitstream comprises a sequence of illumination information, wherein each sequence of illumination information corresponds to a sequence of video objects from a same source, wherein the illumination information is based on a plurality of frames from the same source, and wherein chromatic adaptation for each sequence of video objects is based on corresponding illumination information.

24. The apparatus of claim 19, wherein the processor is further configured to select a background from a plurality of available backgrounds, wherein rendering the video display signal further comprises placing the background in each frame of the plurality of frames.

25. An apparatus comprising:
an ingress port configured to receive a plurality of video bitstreams corresponding to a plurality of sources, wherein each video bitstream comprises a corresponding sequence of video objects, wherein a portion of each video bitstream is based on a color target corresponding to the video bitstream, and wherein each video bitstream does not include its color target; and
a processor coupled to the ingress port and configured to render a video display signal based on a combination of video objects from different sequences.

26. The apparatus of claim 25,
wherein the ingress port is further configured to receive a plurality of bitstreams corresponding to the different sources, wherein each bitstream comprises a sequence of illumination information, wherein each sequence of illumination information corresponds to a sequence of video objects from a same source, wherein the illumination information is based on a plurality of frames from the same source, and
wherein the processor is further configured to perform chromatic adaptation on each sequence of video objects to generate the sequences of local illumination video objects using an illumination reference common to all video objects, wherein chromatic adaptation for each sequence of video objects is based on corresponding illumination information.

27. The apparatus of claim 26, wherein each color target is selected to encompass human skin colors, and wherein chromatic adaptation is applied only to skin pixels of a video object.

* * * * *